Jan. 8, 1957 W. E. BRADLEY 2,777,010

CATHODE RAY BEAM INDEXING SYSTEM

Filed Oct. 11, 1951

INVENTOR.
WILLIAM E. BRADLEY
BY
Allen V. Hazeltine
ATTORNEY

United States Patent Office 2,777,010
Patented Jan. 8, 1957

2,777,010

CATHODE RAY BEAM INDEXING SYSTEM

William E. Bradley, New Hope, Pa., assignor to Philco Corporation, Philadelphia, Pa., a corporation of Pennsylvania Application October 11, 1951, Serial No. 250,932

12 Claims. (Cl. 178—5.4)

The present invention relates to electrical systems and more particularly to cathode-ray tube systems comprising a beam intercepting structure and an indexing member which is arranged in cooperative relationship with the beam intercepting structure and is adapted to produce a signal whose time of occurrence is indicative of the position of the cathode-ray beam on the beam intercepting structure.

The invention is particularly adapted for and will be described in connection with a color television image presentation system utilizing a single cathode-ray tube having a beam-intercepting image forming screen member comprising vertical stripes of luminescent materials. These stripes are preferably arranged in laterally-displaced color triplets, each triplet comprising three vertical phosphor stripes which respond to electron impingement to produce light of different primary colors. The order of arrangement of the stripes may be such that the normal horizontally scanning cathode-ray beam produces red, green and blue light successively. From a color television receiver there may be then supplied three separate video signals, each indicative of a different primary color component of a televised scene, which signals are sequentially utilized to control the intensity of the cathode-ray beam. For proper color rendition, it is then required that, as the phosphor stripes producing each of the primary colors of light are impinged by the cathode-ray beam, the intensity of the beam be simultaneously controlled in response to the contemporaneous value of the video signal representing the corresponding color component of the televised image. However, since the rate at which the beam scans across the phosphor stripes of the screen may be variable, due, for example, to nonlinearity of the beam deflecting signal or due to a non-uniform distribution of the phosphor stripes on the screen surface, a phase synchronous relationship between the signal applied to the intensity control system of the cathode-ray beam and the scanning of the beam must be continuously reestablished. Such a synchronous relationship may be maintained throughout the scanning cycle by deriving, from the beam intercepting structure, indexing signals indicative of the instantaneous position of the cathode-ray beam upon the image forming screen, and by utilizing these indexing signals to control the relative phase of the signal applied to the beam intensity controlling system. The said indexing signals may be derived from a plurality of stripe members arranged on a beam intercepting screen structure each adjacent a triplet so that, when the beam scans the screen, the indexing stripes are excited in space-time sequence to the scanning of the color triplets and a series of pulses is generated in a suitable output electrode system of the cathode-ray tube.

The indexing stripes may comprise a material having secondary-emissive properties which differ from the secondary-emissive properties of the remaining portions of the beam intercepting structure. For example, the indexing stripes may consist of a high atomic number material such as gold, platinum or tungsten or may consist of certain oxides such as cesium oxide or magnesium oxide, and the remainder of the beam intercepting structure may be provided with a coating of a material having a detectably different secondary-emissive ratio such as a coating of aluminum, which coating also serves as a light reflecting mirror for the phosphor stripes in accordance with well known practice. With such an arrangement the indexing signals may be derived from a collector electrode arranged in the vicinity of the screen structure. Alternatively, the indexing stripes may consist of a fluorescent material, such as zinc oxide, having a spectral output in the non-visible light region and the indexing signals may be derived from a suitable photoelectric cell arranged, for example, in a side wall portion of the cathode-ray tube out of the path of the cathode-ray beam and facing the beam intercepting surface of the screen structure.

Under certain conditions, the cathode-ray beam may be extinguished at the instants that it would normally impinge on the index stripes. More particularly, when the transmitted image contains a black area, the beam is extinguished during the scanning of the corresponding area of the reproduced image at the receiver. Furthermore, and as a general rule, the index stripes are arranged only on the phosphor stripes of a particular primary color. When this particular primary color is absent from the color value of the image or flange portion to be reproduced, the beam must be extinguished at the instants that it scans those phosphor stripes which produce light of the primary color under consideration. Thus, in either of the above noted instances, the indexing stripes will not be excited by the beam and the desired index signal will not be generated. Accordingly, during these instants there will be no means for achieving the desired phase synchronisation between the beam intensity control signal and the scanning position of the beam.

It is an object of the invention to provide an improved cathode-ray tube system of the type in which the position of the electron beam on a beam intercepting member is indicated by an indexing signal derived from the indexing member.

A specific object of the invention is to provide a cathode-ray tube system of the foregoing described type in which a clearly defined indexing signal is generated irrespective of the intensity of the primary color components of the image to be reproduced.

These and further objects of the invention will appear as the specification progresses.

In accordance with the invention, the foregoing objects are achieved in a system employing a cathode-ray tube having disposed therein a beam intercepting structure comprising beam position indicating elements arranged in predetermined geometric relationship to the color-image generating portions of the beam intercepting member, by employing within said tube a source of a main beam and a source of an auxiliary electron beam and so arranging the main beam and the auxiliary beam that both beams simultaneously scan the surface of the beam intercepting member in synchronism. In the system of the invention, the video signal representing the image to be reproduced, is applied to the main beam to vary the intensity thereof over the wide range normally required to properly excite the color image producing phosphor stripes and the auxiliary beam is maintained at a substantially constant intensity value generally of the order of a few percent of the maximum intensity of the video information carrying beam.

The invention will be described in greater detail with reference to the appended drawings forming part of the specification and in which.

Figure 1:
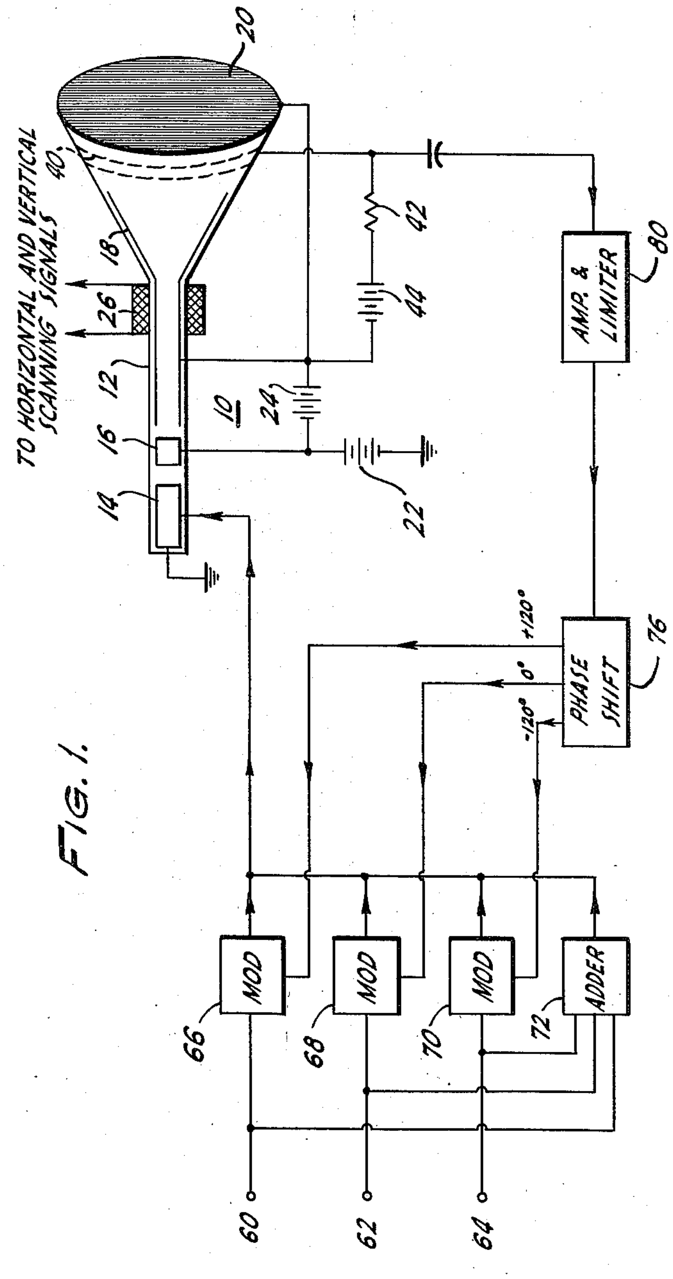
Figure 1 is a block diagram, partly schematic, showing a cathode-ray tube system in accordance with the invention.

Referring to Figure 1, the cathode-ray tube system there shown comprises a cathode-ray tube 10 containing within an evacuated envelope 12, a dual beam generating and intensity control system 14 later to be more fully described, a focusing electrode 16, and a beam accelerating electrode 18 which may consist of a conductive coating on the inner wall of the envelope and which terminates at a point spaced from the end face 20 of the tube in conformance with well established practice. Electrodes 16 and 18 are maintained at their desired operating potentials by suitable voltage sources shown as batteries 22 and 24, the battery 22 having its negative pole connected to ground and its positive pole connected to the electrode 16, and the battery 24 being connected with its positive pole to electrode 18 and with its negative pole to the positive pole of battery 22. In practice the battery 22 has a potential of 1 to 3 kilovolts whereas the battery 24 has a potential of the order of 10 to 20 kilovolts.

A deflection yoke 26 coupled to horizontal and vertical deflection circuits of conventional design is provided for deflecting the dual beams in synchronism across the face plate 20 of the tube to form dual superimposed rasters thereon.

Figure 2:
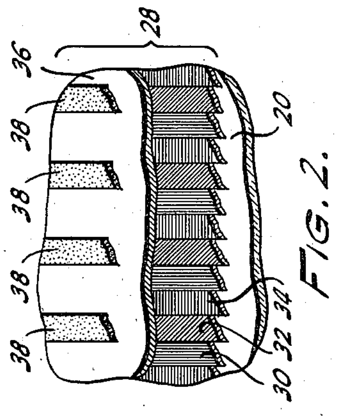
Figure 2 is an enlarged plan view, partly cut away, of a portion of a beam intercepting structure which may be used in the cathode-ray tube system of the invention.

The end face 20 of the tube is provided with a beam intercepting structure 28, one suitable form of which is shown in detail in Figure 2. In the arrangement shown in Figure 2, the structure 28 is formed directly on the face plate 20, however, it should be well understood that the structure 28 may be formed on a suitable light transparent base which is independent of the face plate 20 and may be spaced therefrom. In the arrangement shown, the face plate 20, which in practice consists of glass having preferably substantially uniform transmission characteristics for the various colors of the visible spectrum, is provided with a plurality of groups of elongated parallelly arranged stripes 30, 32 and 34, of phosphor material which, upon impingement by electrons, fluoresce to produce light of three different primary colors. For example, the stripe 30 may consist of a phosphor which, upon electron impingement, produces red light, the stripe 32 may consist of a phosphor which produces green light, and the stripe 34 may consist of a phosphor which produces blue light. Each of the groups of stripes may be termed a color triplet and, as will be noted, the sequence of the stripes is repeated in consecutive order over the area of the structure 28. Suitable materials constituting the phosphor stripes 30, 32 and 34 are well known to those skilled in the art as well as the method of applying the same to the face plate 20, and further details concerning the same are believed to be unnecessary.

In the arrangement shown, the indexing signal is produced by utilizing index stripes of a given secondary-emissive ratio differing from the secondary-emissive ratio of the remainder of the beam intercepting structure, and for this purpose the structure 28 further comprises a thin, electron permeable, conducting layer 36 of low secondary emissivity. The layer 36 is arranged on the phosphor stripes 30, 32 and 34 and preferably further constitutes a mirror for reflecting light generated at the phosphor stripes. It should be well understood that other metals capable of forming a coating in a manner similar to aluminum, and having a secondary-emissive ratio detectably different from that of the material of the indexing member, may also be used. Such other metals may be, for example, magnesium or beryllium.

Arranged on the coating 36 over consecutive stripes 32 are indexing stripes 38 consisting of a material having a secondary-emissive ratio detectably different from that of the material of coating 36. The stripes 38 may be of gold or of other high atomic number metal such as platinum or tungsten, or of an oxide such as magnesium oxide, as previously pointed out.

The beam intercepting structure so constituted is connected to the positive pole of battery 24 by means of a suitable lead attached to the coating 36.

Interposed between the accelerating anode 18 and the beam intercepting structure 28 is an output electrode 40 consisting of a ring-shaped conductive coating for example, of graphite or silver, on the wall of the envelope. Electrode 40 is energized through a load resistor 42 by a suitable source 44, shown as a battery. This source 44 may have a potential of the order of 3 kilovolts.

Figure 3:
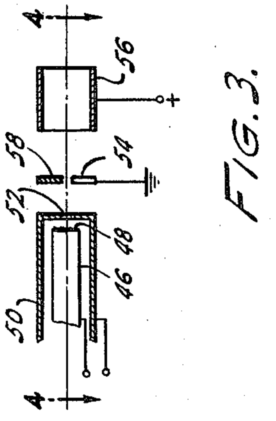
Figure 3 is a cross-sectional view of one form of a dual beam generating assembly for the system of the invention.
Figure 4:
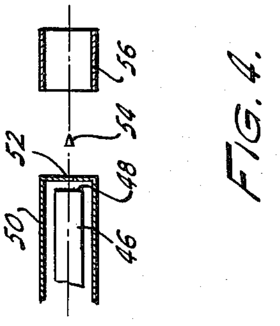
Figure 4 is a cross-sectional view of the assembly of Figure 3 taken along the line 4—4 of Figure 3.

The dual beam generating system 14 may take a variety of forms. A particular effective construction is shown in Figures 3 and 4. The beam generating system there shown comprises a cathode in the form of a metal cylinder 46 provided with an electron emissive coating 48 on the end face thereof, and a control electrode 50 in the form of a metal sleeve which surrounds the cathode cylinder 46 and which is provided with a beam forming control aperture 52 in the end face thereof arranged adjacent to the coating 48. The elements so far described and their arrangement in the system conform to the construction characterizing the usual types of beam generating and control systems for cathode-ray tubes, and in this connection the cathode cylinder 46 and the control electrode cylinder 50 may consist of nickel or the like, and the coating 48 may consist of a mixture of barium and strontium oxides. Suitable means (not shown) are provided within cylinder 46 for heating the coating 48 to its electron emissive temperature. Terminal leads are provided as shown, for external connections to the cathode 46 and control electrode 50 respectively.

The cathode 46 and the control electrode 50 serve as a source of a main beam for the cathode-ray tube, and the intensity of the beam may be varied by applying an appropriate signal between the cathode and control electrodes.

As a source of an auxiliary beam there are provided a cold-emissive cathode 54 and an auxiliary anode 56. The cathode 54 specifically shown, has the form of a knife with the sharp edge thereof facing the anode 56 and is arranged vertically so that the projection of the line of the knife edge passes through the center of the aperture 52 of the electrode 50. The edge of cold-emissive cathode 54 is preferably arranged at a point between the electrode 50 and the anode 56 approximating the cross-over point of the main beam from the cathode 46—48 so that the beam formed by cathode 54 focuses in the same plane as the main beam.

In order to provide a uniform field distribution in the space between electrode 50 and anode 56 there may be provided an auxiliary field electrode 58 which is arranged at the mirror image position of the cathode 54 and is operated at the potential of cathode 54.

The cathode 54 may also take other forms than that specifically shown. For example, the cathode may be in the form of a sharp point arranged in the line of the knife edge system above described and appropriately spaced from the central axis of the main beam. Such a cathode produces a substantially circular auxiliary beam in contrast to the ribbon-shaped beam produced by a knife edge cathode. Furthermore, the cathode 54 may consist of a coating of a suitable cold-emissive material such as cesium in the form of a thin stripe corresponding to the knife edge above referred to, or in the form of a small dot corresponding to the sharp point above noted.

Cathode 54 may be connected to ground potential as shown whereas the anode 56 is operated at a positive potential of sufficient value to produce the desired cold-emission from the cathode 54.

In some instances, the presence of the anode 56 may influence the focusing plane of the electrons passing therethrough. However, as is readily apparent to those skilled in the art, a suitable compensation may be achieved by appropriately adjusting the potential of the anode 16 (see Figure 1) whereby both the main and the auxiliary beams are made to focus on the plane of the beam intercepting structure 28.

The assembly 14 may take forms other than those above specifically shown. For example, the assembly may consist of two individual beam generating systems of conventional design arranged vertically in line and directed in the same direction whereby both beams are controlled by the focussing and accelerating electrodes 16 and 18 and the deflecting system 26 so that the two beams are simultaneously scanned across the surface of the beam intercepting member 28. Similarly, the cathode 54 may be replaced by a thermionic cathode arranged in the position shown in Figure 3, or arranged vertically above the cathode-control electrode system 46—50 of the system of Figure 3. In the latter cases, the auxiliary electrode 56 may be dispensed with or may be utilized as a field electrode which, by an appropriate selection of its operating potential, brings the electron beams from the respective cathode sources into a desirably closely spaced positional relationship.

For the reproduction of a color image on the face plate of the cathode-ray tube there are provided color signal input terminals 60, 62 and 64 (see Figure 1) which are supplied from a television receiver with separate signals indicative of the red, green and blue components of the televised scene, respectively. The system then operates to effectively convert these three color signals into a wave having the color information arranged in time reference sequence so that the red information occurs when the cathode-ray beam impinges the red stripe 30 of the beam intercepting structure 28, the green information occurs upon impingement of the green stripe 32 and the blue information occurs when the blue stripe 34 is impinged.

The conversion of the color signals into a wave having the color information arranged in time reference sequence may be achieved by means of a modulation system suitably energized by the respective color signals and by appropriately phase related modulating signals. In the arrangement specifically shown, the desired conversion is effected by means of sine wave modulators 66, 68 and 70 in conjunction with an adder 72. Modulators 66, 68 and 70 may be of conventional form and may each consist, for example, of a dual grid thermionic tube to one grid of which is applied the color signal from the respective terminals 60, 62 and 64, and to the other grid of which is applied an individual modulation signal. The modulation signals may be derived from a phase shifter 76 adapted to produce, by means of suitable phase shifting networks, three modulation voltages appropriately phase displaced. In the arrangement specifically described, wherein the phosphor stripes 30, 32 and 34 (see Figure 2) are uniformly distributed throughout the width of each color triplet, the modulation voltages from the phase shifter 76, bear a 120° phase relationship as shown.

The individual waves produced at the outputs of the modulators will be sine waves each amplitude modulated by the color signal applied to the respective modulators and each having a phase relationship determined by the particular signal which is applied to the modulator from the phase shifter 76. The three modulators are coupled with their outputs in common whereby the three waves are combined to produce a resultant wave having a frequency at the frequency of an indexing signal derived from an amplifier and limiter 80 as later to be more fully described and having amplitude and phase variations proportional to the variations of amplitudes of the color signals at terminals 60, 62 and 64.

Each of the color signals supplied to the input terminals of modulators 66, 68 and 70 will, in general, include a reference level component definitive of brightness. While each modulator may be constructed so as to transmit this reference level component to its output, in practice this is generally not done. Preferably, the three color signals are combined, in proper proportions, in the adder 72 to yield a single signal representative of the overall brightness of the image to be reproduced, and this signal is in turn combined with the outputs of the modulators.

The resultant wave derived from the modulators 66, 68 and 70 and from the adder 72 is applied as a control potential to the dual beam generating system 14, i. e., to the control electrode 50 of the system of Figure 3, whereby the intensity of the main beam generated by the system 14 is varied in time sequence proportionally to the amplitudes of the input signals at terminals 60, 62 and 64.

These intensity variations of the beam are made to occur in synchronism with the scanning of the phosphor stripes, so that the beam has an intensity value determined by one of the input signals when the beam impinges a given one of the phosphor stripes, the beam has a second intensity value as determined by a second of the input signals when the beam impinges a second of the phosphor stripes, and has a third intensity value as determined by the third input signal when the beam impinges on the third of the phosphor stripes. Such synchronism between the contemporaneous value of the signal applied to the main beam intensity control electrode and the scanning of the phosphor stripes, is achieved in the system specifically shown by reason of the fact that the phase position of the wave generated by the modulators 66, 68 and 70 is varied in synchronism with the phase variations of the indexing signal which is generated across the load impedance 42 each time one of the index stripes 38 is impinged by electrons and which is applied to the phase shifter 76 through the amplifier and limiter 80. Amplifier 80 is of conventional form and is characterized by having sufficient gain to amplify the indexing signals supplied thereto to a conveniently usable level, and may be adapted to do so without distortion of the indexing pulse waveform, although this is not essential so long as the phase characteristics of the amplifier are such that the peaks of the amplifier output signals therefrom occur in predetermined time relationship to the times of occurrence of peaks of the input signal from the load resistor 42. The amplifier may further contain an amplitude limiter of conventional design by means of which a substantially constant amplitude output signal is produced.

Under normal conditions, i. e., when each of the picture elements to be reproduced comprises a component of each of the three color signals applied to input terminals 60, 62 and 64 so that the main beam has a finite minimum intensity value throughout the scanning period, the scanning of the main beam over the index stripes 38 (see Figure 2) will generate across load resistor 42 an indexing signal indicative of the position of the beam. However, in practice it is found that the image to be reproduced frequently contains large areas of no color (black) or large areas substantially free from the particular primary color generated by the phosphor stripes on which the index stripes are positioned, so that the index stripes arranged in these areas will not be excited by the beam. Under these conditions, no index signal is produced by the image producing scanning beam. The lack of an index signal during these intervals will, due to the absence of a synchronizing influence from the amplifier 80, reduce the color quality of the image area being reproduced and in most instances will effect the color quality of the immediately surrounding image areas because of the normal delay before the system becomes again synchronized.

In the system of the invention, the foregoing difficulty is obviated by the auxiliary beam which is derived from the auxiliary cathode 54 and the intensity of which is independent of the intensity of the video signal controlling the main beam. Accordingly, throughout each line scan of the beam intercepting member, each of the index stripes will be excited by electrons irrespective of the fact that the main beam may be cut off by the video signal. Since the auxiliary beam is deflected by the same deflection system as the main beam, the auxiliary beam will move in synchronism with the main beam and intersect consecutive stripes of the intercepting member at the same instant as the main beam or at an instant bearing a fixed time relationship to the instant of impingement by the main beam. Accordingly, the index signal produced by the impingement of electrons from the auxiliary beam will be indicative of the position of the main beam.

The intensity of the auxiliary beam should be small relative to that of the main beam in order to avoid desaturation of the colors produced by the main beam. An auxiliary beam having an intensity of the order of two microamperes or of 1% of the peak intensity of the main beam, whichever is the smaller, is sufficient to produce the required indexing signal without significantly desaturating the image colors generated by the main beam. The use of a cathode 54 in the form of a knife edge, to form a ribbon shaped auxiliary beam, has been found advantageous in this connection because, by its use, sufficient electron current for producing a well defined index signal is available at an electron density which produces only a small amount of light from the phosphor stripes impinged by the auxiliary beam.

While I have described my invention by means of specific examples and in a specific embodiment, I do not wish to be limited thereto, for obvious modifications will occur to those skilled in the art without departing from the spirit and scope of the invention.

What I claim is:

1. A cathode-ray tube system comprising, a cathode-ray tube having sources of first and second electron beams, control means to vary the intensity of one of said beams independently of the intensity of the other of said beams, means to impart equal velocities to the electrons of said beams, and a beam intercepting structure, said beam intercepting structure comprising a plurality of first portions arranged in a given geometric configuration and adapted to produce a given response upon electron impingement, said structure further comprising a plurality of second portions adapted to produce a second given response different from said first given response upon electron impingement, said second portions being arranged in a second given geometric configuration indicative of said first configuration and being uniformly positioned relative to said first portions throughout the effective area of said beam intercepting structure, means to scan said beams in synchronism across said beam intercepting structure, thereby to produce on said structure two superimposed scanning patterns of substantially the same size, means to apply to said control means a wave having variations indicative of desired variations of the response of said first portions, and means to derive from said second portions a control quantity proportional to the rate of scanning of said second beam over said second portions.

2. A cathode-ray tube system as claimed in claim 1 further comprising means responsive to said control quantity to establish the time phase position of the variations of said wave.

3. A cathode-ray tube system as claimed in claim 1 wherein said second beam is a constant intensity beam.

4. A cathode-ray tube system as claimed in claim 1 wherein said source of said second beam is a cold-emissive cathode arranged in a vertical plane including the axis of said first beam.

5. A cathode ray tube system comprising a cathode ray tube having sources of first and second electron beams, control means for varying the intensity of one of said beams independently of the intensity of the other of said beams, and a beam intercepting structure, said beam intercepting structure comprising a plurality of first portions arranged in a given geometric configuration adapted to produce a given response upon electron impingement, said structure further comprising a plurality of second portions arranged in a second given geometric configuration indicative of said first configuration and adapted to produce a second given response different from said first given response upon electron impingement, said source of said second beam comprising a cold emission cathode in the form of a knife edge arranged in a vertical plane including the axis of said first beam, means for scanning said beams in synchronism across said beam intercepting structure, means for applying to said control means a wave having variations indicative of desired variations of the response of said first portions, and means for deriving from said second portions a control quantity proportional to the rate of scanning said second beam over said second portions.

6. A cathode-ray tube system comprising, a cathode-ray tube having sources of first and second electron beams, control means to vary the intensity of said first beam independently of the intensity of said second beam, means to impart equal velocities to the electrons of said beams, and a beam intercepting structure, said beam intercepting structure comprising consecutively arranged first portions each comprising a plurality of stripes of fluorescent material, each of said stripes producing light of a different color in response to electron impingement, said beam intercepting structure further comprising second portions spaced apart and arranged substantially parallel to said first stripes and comprising a material having a given response different from the response of said first portions upon electron impingement, said second portions being uniformly positioned relative to said color stripes throughout the effective area of said beam intercepting structure, means for periodically scanning said beams in synchronism across the said intercepting structure thereby to produce on said structure two superimposed scanning patterns of substantially the same size, a source of signal energy indicative of desired excitation of successive stripes of said first portions, means to derive from said second portions a control quantity proportional to the rate of scanning of said second beam over said second portions, means coupled to said signal energy source and responsive to said control quantity to produce a wave having recurrent discrete portions thereof indicative of desired excitation of successive stripes of said first portions arranged at time intervals as determined by the position of said second portions, and means to apply said wave to said control means of said first beam.

7. A cathode-ray tube system as claimed in claim 6 wherein said control quantity has a frequency proportional to the rate of scanning said second portions and has instantaneous phase positions as established by the said positions of said second portions, and wherein said wave has a frequency corresponding to the rate of scanning of said first portions and instantaneous phase positions as established by the phase positions of said control quantity.

8. A cathode-ray tube system comprising a cathode-ray tube having sources of first and second electron beams, means to vary the intensity of said first beam independently of the intensity of said second beam, means to impart equal velocities to the electrons of said beams, and a beam intercepting structure, said structure comprising consecutively arranged parallel first portions each comprising three stripes of fluorescent material, each of said stripes producing light of a different color in response to electron impingement, said beam intercepting structure further comprising stripe portions comprising a material having a given response characteristic different from the response of said first portions upon electron impingement, said second stripe portions being spaced apart and arranged substantially parallel to said color stripes and being uniformly positioned relative to said color stripes throughout the effective area of said beam intercepting structure, means for periodically scanning said beams in synchronism across said intercepting structure thereby to produce on said structure two superimposed scanning patterns of substantially the same size, means to derive from said intercepting structure a control quantity having amplitude variations which are proportional to the intensity of said second beam and the said response characteristic of said second stripes and which recur at a rate proportional to the rate of scanning said second stripes, input means for three signals each having amplitude variations representative of desired excitation of a respective one of the said stripes of said successively arranged stripe portions, and means responsive to said control quantity for combining said three signals to produce a wave having recurrent discrete portions arranged in a sequence conforming to the scanning sequence of said color stripes and having instantaneous phase positions as established by the said configuration of said second portions.

9. A cathode-ray tube system as claimed in claim 8 wherein said means responsive to said control quantity to combine said three signals comprises, means actuated by said control quantity to generate three modulation waves having a frequency proportional to the rate of scanning said first portions, having an instantaneous phase position as established by said control quantity and having a predetermined phase displacement relative to each other, first, second and third modulators each having input circuits energized by a respective one of said three signals and by one of said waves, and means to combine the output circuits of said modulators.

10. A cathode ray tube system comprising, a cathode ray tube having sources of first and second electron beams, control means for varying the intensity of said first beam independently of the intensity of said second beam, means to impart equal velocities to the electrons of said beams, and a beam intercepting structure, said beam intercepting structure comprising consecutively arranged first portions each comprising a plurality of stripes of fluorescent material, each of said stripes producing light of a different color in response to electron impingement, said beam intercepting structure further comprising second portions spaced apart and an electron permeable light reflecting layer interposed between said stripes of fluorescent material and said second portions, said second portions being arranged substantially parallel to said fluorescent stripes and being uniformly positioned relative to said fluorescent stripes throughout the effective area of said beam intercepting structure and comprising a material having a response detectably different from the response of said electron permeable layer upon electron impingement, means for periodically scanning said beams in synchronism across the said intercepting structure thereby to produce on said structure two superimposed scanning patterns of substantially the same size, means for applying to said control means a wave having variations indicative of desired excitation of said consecutively arranged fluorescent stripes, and means for deriving from said second portions a control quantity having variations as determined by the rate of scanning said first beam over said second portions.

11. A cathode ray tube system comprising, a cathode ray tube having a source of a first electron beam of relatively low intensity, a source of a second electron beam, control means for varying the intensity of said second beam to an intensity value substantially greater than the intensity value of said first beam and independently of the intensity of said first beam, and a beam intercepting structure, said beam intercepting structure comprising a plurality of first portions arranged in a given geometric configuration and adapted to produce a given response upon electron impingement, said structure further comprising a plurality of second portions arranged in a second given geometrical configuration indicative of said first configuration and adapted to produce a second given response detectably different from said first given response upon electron impingement, means for scanning said beams in synchronism across said beam intercepting structure, means for applying to said control means a wave having variations indicative of desired variations of the response of said first portions thereby varying the intensity of said second beam to intensity values substantially greater than the intensity value of the said first beam, and means for deriving from said second portions a control quantity having variations as determined by the rate of scanning said first beam over said second portions.

12. A cathode ray tube system for producing a color television image, comprising a cathode ray tube having a source of a first electron beam of relatively low intensity, a source of a second electron beam, control means for varying the intensity of said second beam to an intensity value substantially greater than the intensity value of said first beam and independently of the intensity of said first beam, and a beam intercepting structure, said beam intercepting structure comprising consecutively arranged first portions each comprising a plurality of stripes of fluorescent material, each of said stripes producing light of a different color in response to electron impingement, said beam intercepting structure further comprising second portions spaced apart and arranged substantially parallel to said first stripes in a geometric configuration indicative of the position of said color stripes and an electron permeable light reflecting layer interposed between said stripes of fluorescent material and said second portions, said second portions comprising a material having a given response detectably different from the response of said electron permeable layer upon electron impingement, means for periodically scanning said beams in synchronism across the said intercepting structure, means for applying to said control means a wave having variations indicative of desired excitation of said consecutively arranged fluorescent stripes thereby varying the intensity of said second beam to intensity values substantially greater than the intensity value of said first beam, and means for deriving from said second portions a control quantity having variations as determined by the rate of scanning said first beam over said second portions.

References Cited in the file of this patent

UNITED STATES PATENTS

| | | |
|---|---|---|
| 2,343,825 | Wilson | Mar. 7, 1944 |
| 2,463,535 | Hecht | Mar. 8, 1949 |
| 2,490,812 | Huffman | Dec. 13, 1949 |
| 2,530,431 | Huffman | Nov. 21, 1950 |
| 2,545,325 | Weimer | Mar. 13, 1951 |
| 2,573,777 | Sziklai | Nov. 6, 1951 |
| 2,609,521 | Coeterier | Sept. 2, 1952 |
| 2,631,259 | Nicoll | Mar. 10, 1953 |
| 2,633,547 | Law | Mar. 31, 1953 |
| 2,644,855 | Bradley | July 7, 1953 |